July 7, 1964

D. W. EGBERT 3,139,757

DRAG STATIC WHEEL BALANCER

Filed May 19, 1961

INVENTOR.
DELBERT W. EGBERT
BY
Robinson & Berry
ATTORNEYS

United States Patent Office 3,139,757
Patented July 7, 1964

3,139,757
DRAG STATIC WHEEL BALANCER
Delbert W. Egbert, 3424 14th S., Seattle, Wash.
Filed May 19, 1961, Ser. No. 111,250
4 Claims. (Cl. 73—457)

This invention relates to a method of and devices designed for use in wheel balancing operations and more particularly to a device whereby rotating bodies such as fly wheels; the wheels of road vehicles including automobiles, trucks, or the like, may be tested for balance without requiring that they be removed for that purpose from the axles or vehicle to which they are applied.

It is the principal object of this invention to provide a device or tool here designated as a "Drag Test Balancer" for use in the balancing of wheels, particularly tire equipped wheels as applied on the larger types of automotive road vehicles. Furthermore, a device that may be easily and readily applied to a wheel for its testing; that is simple in its mode of use and which comprises few and relatively inexpensive parts.

Another object of the invention resides in the provision of a device of the character above stated including a cross arm adapted to be supported horizontally from and diametrically across a wheel that is to be balanced and along the opposite end portions of which arm a weight is applicable in the test for balance; said end portions of the cross-arm being graduated in order that the radial distances that the weight must be adjusted from the turning axis of the wheel to induce its turning in opposite directions may be measured and this measurement used as a basis for the determination of its heaviest point preparatory to the application of balancing weights to the wheel.

Further objects and advantages of the invention reside in the details of construction and combination of its parts and in the mode of use of the device, as will hereinafter be fully described.

In accomplishing these and other objects of the invention, I have provided the improved details of construction, the preferred forms of which are illustrated in the accompanying drawings wherein.

The present views of the drawings are illustrative of the application of the present tool in one of its most common uses. It is to be understood, however, that wheels of different kinds and uses may require various other means for mounting the device for use and it is not the intent that the claims which terminate the specification shall be limited to any specific attaching means which is not inconsistent with the spirit of the invention.

Figure 1:
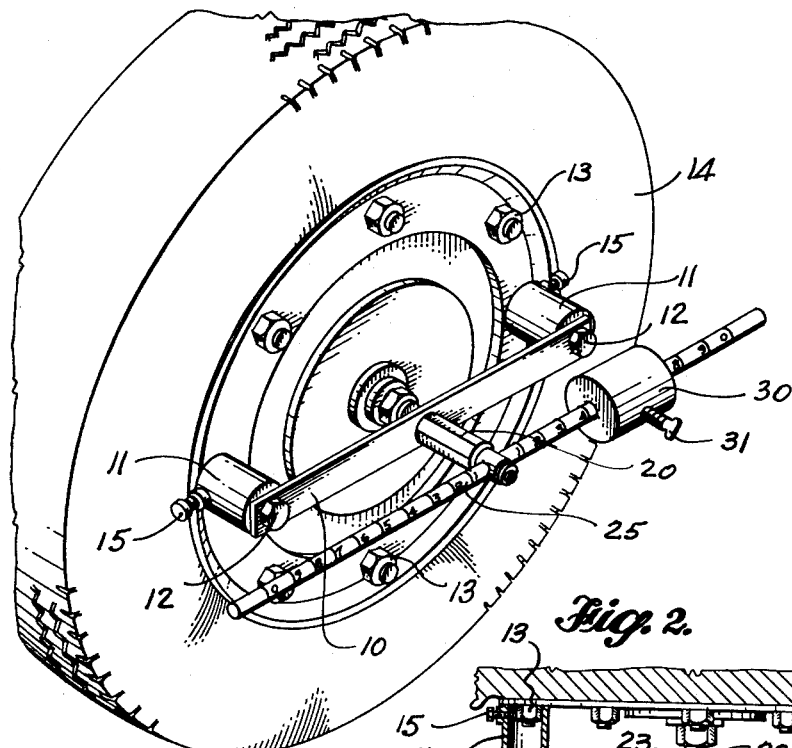
FIG. 1 is a perspective view showing the present balancing test device as applied to a truck wheel for its use in the intended manner.
Figure 2:
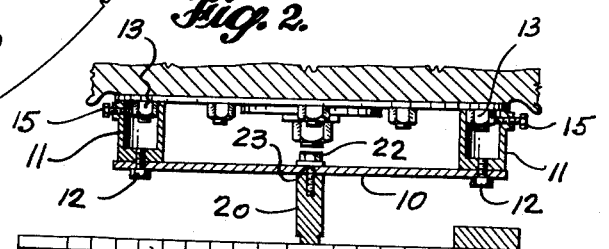
FIG. 2 is a cross-sectional view of the device taken in the horizontal axial plane of its mounting bar.

Referring more in detail to the drawings:

The present device, as shown in FIGS. 1 and 2 comprises a rigid attaching bar 10 to the opposite ends of which bar mounting cups 11—11 are fixed by bolts 12 as best shown in FIG. 2. These two cups 11—11 are of equal weight and size and are applied to the inside surface of the bar 10. They are axially parallel and both open in the same direction, and are in such spacing that in the application of the bar to a wheel they will receive diametrically opposite securing nuts 13 of the vehicle wheel 14 therein, as has been shown in FIG. 2. The cups 11—11 are each applied over the nuts 13 and are then secured rigidly thereto by set screws or bolts 15—15 which are applied through the cup walls and tightened against the nuts.

It is to be understood that the cross-bar 10 with its mounting cups 11—11 as secured thereto, when applied to the wheel, will be perfectly balanced in any position of the wheel and will have no turning influence thereon in the testing operation presently to be described.

Fixed to the bar 10 midway of its ends and in such position as to be coaxially aligned with the wheel axis when the bar 10 is secured in position as above described, is a post 20 which extends outwardly therefrom to a point slightly beyond the vertical plane of the outer side surface of the wheel 14. This post 20 is fixed in this position to bar 10 by a short bolt 22 that extends outwardly through a hole 23 in the bar 10 located midway of its ends. The bolt is threaded into the post 20, as shown in FIG. 2, to frictionally restrain the turning of the bar 10 and post 20.

Mounted on the outer end of the post 20 and secured against turning thereon is a round rod 25 which is parallel with the vertical plane of bar 10. The opposite end portions of the rod extend equally to opposite sides of the post 20 and are in perfect balance. The rod is held in relationship to the post by the set screw 24. This rod 25 is graduated equally in opposite directions from the opposite sides of the post 20 and a weight 30 with an axial bore 30' therethrough is adapted to be interchangeably applied to opposite end portions of the rod for sliding adjustment therealong. This weight has a set screw 31 threaded thereinto and adjustable against the rod to hold the weight at any set position of adjustment, when such is desired.

It is to be understood that with this testing device applied to the wheel in the manner shown in FIG. 1, but with the weight 30 removed therefrom, it will be in perfect balance at any setting of the wheel and its application to the wheel will have no turning influence thereon.

To test a wheel for balance, the bar 10 is first applied diametrically across the wheel with the cups 11—11 at its ends seated over and fixed by their locking bolts 15 to diametrically opposite nuts 13 of the wheel securing bolts. Alternatively, the opposite end portions of the bar 10 might be fixed to the wheel rim or to the wheel tire by any suitable means. However, it is of importance that regardless of the manner of its mounting on the wheel, the device with weight 30 removed from rod 25 shall have no axial turning influence on the wheel.

Then with the graduated cross-rod 25 disposed in horizontal position and so fixed by its mounting post 20 as to rotate with the wheel 14, the wheel is then jacked up for free axial rotation. It is to be understood that wheels of this character, as ordinarily mounted and even if imperfectly balanced, will remain at rest until some force is applied thereto to start them rotating. This is due to bearing friction, grease or other elements or forces that restrain the moving of the wheel.

Figure 3:
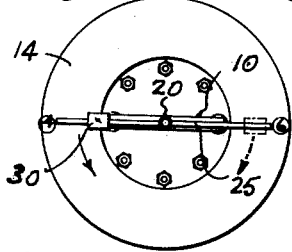
FIGS. 3, 4, 5, 6 and 7 are views schematically illustrating successive steps in the use of the tool in a wheel balancing operation.

After it has been jacked free of a supporting surface and the test device applied thereto, the weight 30 is applied to one end portion of the horizontally extending rod 25, and the weight shifted close to the center of supporting post 20. The weight is then slowly adjusted outwardly therealong until, under the influence of the weight, the wheel starts to turn. The position of the weight on the rod, when the wheel started to turn is then carefully noted and marked on the wheel tire, as for example, the encircled figure 6, as shown in FIG. 3, indicates that the weight had been shifted to the six inch graduation from the center post 20 when the rotation started.

Figure 4:
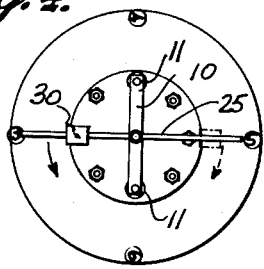
Figure 6:
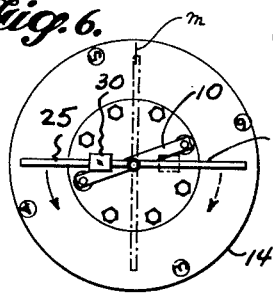
Figure 7:
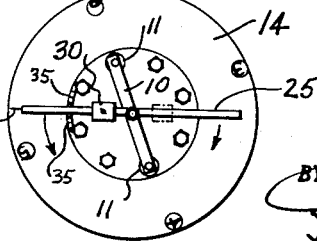

The weight 30 is then removed from that end portion of the rod 25 and is applied in like manner to its opposite end portion and the testing operation repeated and the reading taken at the start of rotation is marked on the tire adjacent that end of the rod. It is to be understood that the encircled figures 6 and 4 shown on the wheel tire in FIG. 3 indicate the distances from center post 20 that the weight 30 was required to be outwardly adjusted in order to start the wheel rotating. The fact that these two distances, 4" and 6", respectively, to start rotation in opposite directions, were not equal is an indication of an unbalanced wheel.

The next step in the present test requires that the wheel 14 be rotated through a 90° interval, and held while the cross-rod 25 is adjusted to a horizontal position and then fixed against rotation relative to bar 10 and post 20. The weight 30 is then applied to one end of rod 25 and adjusted outwardly thereon until the wheel starts to turn. The position of the weight outwardly from post 20 is noted and marked on the tire as previously explained. A like testing operation is then made with the weight applied to the opposite end portion of the rod 25 and the outward distance of the weight when turning of the wheel began is marked on the tire. The wheel tire then has the four markings, here shown to be the encircled figures 3, 5, 4 and 6.

Figure 5:
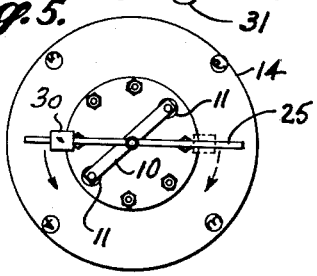

The next step is to rotatably adjust the wheel so that the low numbers as marked on the wheel tire are at the lower side of the wheel as in FIG. 5. These numbers identify the heavier side of the wheel. The bar 25 is again adjusted to horizontal position and secured relative to bar 10. The weight 30 is again applied alternately to opposite ends of the rod 25 and wheel turn starting tests made and starting points as read on the graduated opposite end portions of the cross-rod 25 are noted. If these notations are not equal, this is an indication that the heaviest point of the wheel is not midway of the encircled figures 3 and 4. The heavier side of the wheel is then rotatably adjusted slightly downward; the bar 25 again adjusted to horizontal position and the two tests repeated. This latter testing operation is repeated and wheel rotation adjustments made until the weight test shows that the weight must be moved equal distances along opposite end portions of the cross rod 25 to start wheel rotation. The heaviest part of the wheel will then be at the bottom thereof and a mark –m– is then made at the top of the wheel to indicate the radial line of the wheel for the placement of a balancing weight. After the mark is made at the top of the wheel, the rod 25 is turned to the dotted line position illustrated in FIG. 6 so that the rod is on the radial center line of the heavy side of the wheel. With the rod so positioned the wheel is now rotated so that the rod is horizontal as shown in full line in FIG. 6. Lead balancing weights 35—35 of equal weight are applied to the rim of the wheel at equal distances on opposite sides of the mark –m–. The distance of the lead balancing weights from the mark –m– as well as the size of the lead balancing weights will vary as required to balance the wheel. This is determined by adjusting the weight 30 so that the wheel will begin to rotate when the weight 30 is moved outwardly exactly the same distance on opposite ends of the rod 20.

One of the main features of this "drag static wheel balancer" is that it works equally well even though there is grease or bearing drag resisting the rotation of the wheel. In other words, the normal or reasonable drag in a wheel mounting does not impair the accuracy or efficiency of this balancing device.

While it is desirable that the most practical means for securement of cross-bar 10 and rod 25 be employed, it is apparent that various means might be employed for these purposes, and may be dependent on the kind or character of the wheel under test. It will also be appreciated that this device may be used for balancing wheels on devices other than automotive vehicles.

What I claim as new is:

1. A device for balancing a wheel, said device comprising a cross bar, means on opposite ends of the cross bar for horizontally mounting the cross bar on the wheel diametrically across the face, symmetrically therewith and in perfect balance, a horizontally disposed post fixed to said cross bar and extending outwardly therefrom coaxially with said wheel, a cross rod rotatably mounted on the free end of said post diametrically of said wheel with the ends of the cross rod extending to opposite sides of the vertical axis of said wheel, said cross rod being balanced in its mounting so that it imparts no rotative movement to the wheel while at rest, a balance testing weight selectively applicable to opposite end portions of said cross rod and movable inwardly and outwardly therealong and a graduated scale, on each side of the center of the cross rod to note the distance said weight is positioned outwardly from the axial line of the wheel when rotation of the wheel begins.

2. A wheel balancing device as in claim 1 wherein the ends of the cross bar are cup-like cylinders having an open end and a closed end, said cross bar being secured to said closed end and the open ends being removably applied to diametrically aligned securing nuts on the hub of the wheel and set screws applied through the side walls of each cylinder and holdingly engaged with said securing nuts.

3. A wheel balancing device as in claim 1 wherein said cross rod is mounted by said post for angular adjustment relative to the cross bar while maintained in a plane parallel thereto.

4. The method of balancing a wheel comprising mounting the wheel for rotation on a horizontal axis, mounting a weight supporting rod on said wheel, alternately applying a testing weight to the rod at points along a horizontal diametric line, at opposite sides of the wheel axis, and noting the exact radial distances from the wheel axis at which the weight overcame the inertia of the wheel and induced rotative movement, then turning the wheel through a 90° interval and repeating the application of the weight to overcome wheel inertia and induce rotative movement, noting the ends of the two diametric lines where the radial distances required for wheel turning by said weight were the greatset and turning the wheel to dispose these ends at the top side of the wheel, then alternately applying the testing weight to the rod at points at opposite sides of its axial line on a horizontal diametric line and noting the distance from the wheel axis for starting wheel rotation, then adjusting the wheel slightly downwardly at the side at which the weight was nearer the axis, repeating the test after slight downward rotative adjustment of the wheel in the same direction until the distances of the weight adjustments from the axis of the wheel become equal and attaching balancing weights to the wheel rim at the top of the wheel.

References Cited in the file of this patent

UNITED STATES PATENTS

| | | |
|---|---|---|
| 1,832,479 | Eakins | Nov. 17, 1931 |
| 2,201,982 | Bozarek | May 28, 1940 |
| 2,613,533 | Jones | Oct. 14, 1952 |
| 2,752,788 | La Penta | July 3, 1956 |
| 2,972,256 | MacMillan | Feb. 21, 1961 |

FOREIGN PATENTS

| | | |
|---|---|---|
| 200,788 | Germany | July 8, 1908 |
| 1,080,687 | France | Dec. 13, 1954 |
| 746,520 | Great Britain | Mar. 14, 1956 |
| 846,951 | Great Britain | Sept. 7, 1960 |